United States Patent Office 3,400,326
Patented Sept. 3, 1968

3,400,326
DEVICE FOR AUTOMATIC REACTIVE POWER REGULATION IN ELECTRIC NETWORKS
Leonid Alexeevich Zhukov, Lefortovsky val, 7/6, korpus 9, kv. 16; Ilya Ilich Kartashov, Scherbakovskaya ulitsa, 58, kv. 52; Evgenia Alexandrovna Pankratova, Frunzenskaya Naberezhnaya 24/1, kv. 215; and Jury Petrovich Ryzhov, Beskudnikovsky bulvar 20, korpus 2, kv. 10, all of Moscow, U.S.S.R.
Filed Feb. 18, 1966, Ser. No. 528,596
2 Claims. (Cl. 323—101)

ABSTRACT OF THE DISCLOSURE

Reactive power regulation in electric networks using controlled gates, series-connected with static capacitors, wherein the conduction period of said controlled gates is varied by applying boost current pulses to said static capacitors to charge them above the supply of voltage, thereby providing high-speed regulation of the reactive power output without accompanying current surges, said charging pulses being timed as required by the network operating conditions and the desired reactive power output.

---

This invention relates to reactive power regulation in power networks.

Distribution networks of modern power systems, industrial enterprises and railroads extensively employ static capacitor banks used as reactive power sources. The operational and economic effects of the use of static capacitor banks in distribution networks and power systems are appreciably enhanced by regulating the reactive power outputs of static capacitor banks. Reactive power regulation problems can best be solved by continuous regulation of reactive power in normal steady-state network operation conditions, and by rapidly raising the reactive power output in transient network operation.

The available techniques for reactive power regulation in electric networks are based on the use of devices employing static capacitors series-connected with controlled diode gates placed in parallel opposition. Said devices regulate reactive power by varying the conduction period of the controlled gates.

A serious drawback of this regulation technique is large current surges (two in each cycle) caused by a capacitance and low resistance circuit being connected into the distribution network when the instantaneous values of the voltage across the network terminals are other than zero.

An object of the invention is to provide an improved reactive power control device for electric networks making possible high-speed reactive power regulation without accompanying current surges.

In accordance with the invention, this object is accomplished by varying the conduction period of the controlled diode gates which is achieved by applying current pulses to static capacitors to charge them above the supply voltage. Charging by current pulses is timed as required by the network operating conditions and a desired reactive power output.

To achieve the above objective, the controlled diode gates and static capacitors used in the device of the present invention are arranged in two balanced three-phase circuits supplied from three-phase supply transformers, connected so as to cancel out higher current harmonics. For charging the static capacitors of the balanced circuits, provision is made for a control pulse generator.

The control pulse generator includes two balanced three-phase oscillatory circuits, each comprising three-phase pulse transformer and capacitor networks, two D.C. voltage supply sources for said oscillatory circuits, and banks of ancillary diode gates adapted for current control in said oscillatory circuits.

For a better understanding of the invention, there is given below a description of an exemplary embodiment thereof to be taken in conjunction with the accompanying drawings, in which.

Figure 1:
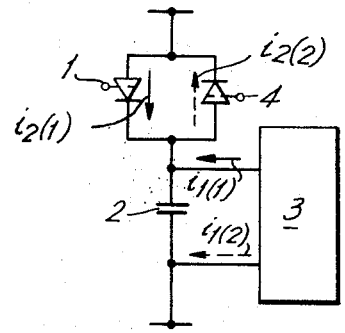
FIG. 1 is a circuit diagram of a single-phase embodiment of the invention.
Figure 2:
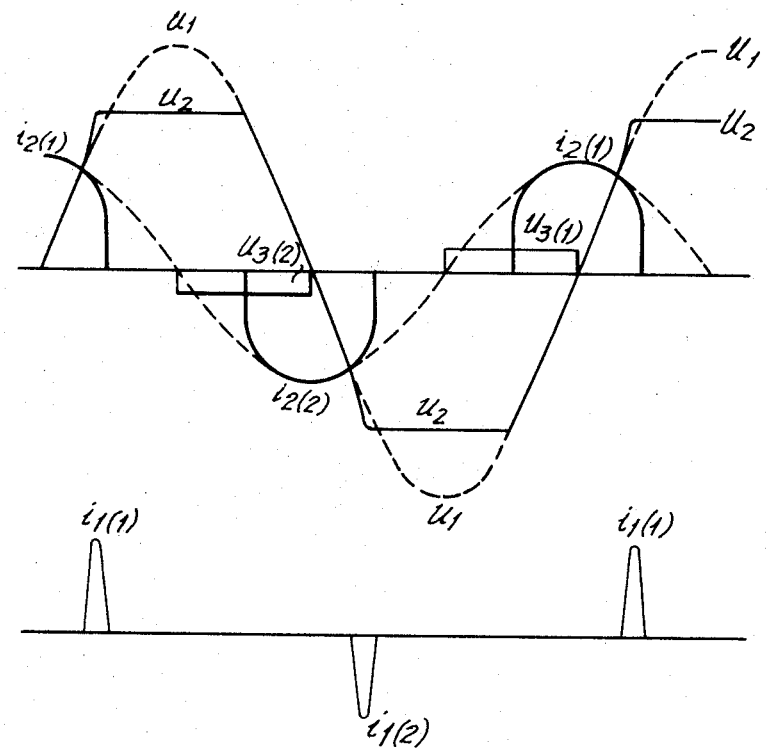
FIG. 2 illustrates diagrams of the line voltages, the voltage across the static capacitors, the circuit currents and the control voltages of the diode gates.

As can be seen in FIGS. 1, 2 the anode voltage of conducting diode gate 1 insignificantly exceeds its cathode voltage by the difference between supply voltage $U_1$ and capacitor voltage $U_2$, said difference being equal to the voltage drop across gate 1. Gate 1 can draw current only when $U_1-U_2$ is larger than zero. Consequently, to cut off gate 1, current pulse $i_{1(1)}$ is delivered by the control pulse generator 3 and is applied to static capacitor bank 2 in phase with current $i_{2(1)}$ generately by $U_1$. At this moment, a cut-off voltage appears at the control electrode of gate 1. After gate 1 has been cut off, static capacitor bank 2 conducts no current and its voltage remains constant and equal to the voltage across static capacitor bank 2 when gate 1 ceases to conduct.

Static capacitor bank 2 begins to conduct again as soon as gate 4 opens when the cut-off voltage is removed from its control electrode at the moment varying voltage $U_1$ becomes equal to $U_2$ across static capacitor bank 2. The gate opens since at that moment its anode becomes positive with respect to the cathode. No current surge is generated when gate 4 opens, as at that moment the difference between the supply voltage $U_1$ and the capacitor bank voltage $U_2$ is practically zero. Static capacitor bank 2 draws current $i_{2(2)}$ until control pulse generator 3 delivers second current pulse $i_{1(2)}$.

The operational cycle of gates 1 and 4 described above repeats itself in each A.C. voltage cycle of the source. The reactive power output of static capacitor bank 2 depends on how long static capacitor bank 2 conducts during each cycle. Said power output is regulated by varying the moment of delivery of current pulses $i_1$ and $i_{1(2)}$ by control pulse pulse generator 3, relative to the beginning of the supply voltage cycle.

Figure 3:
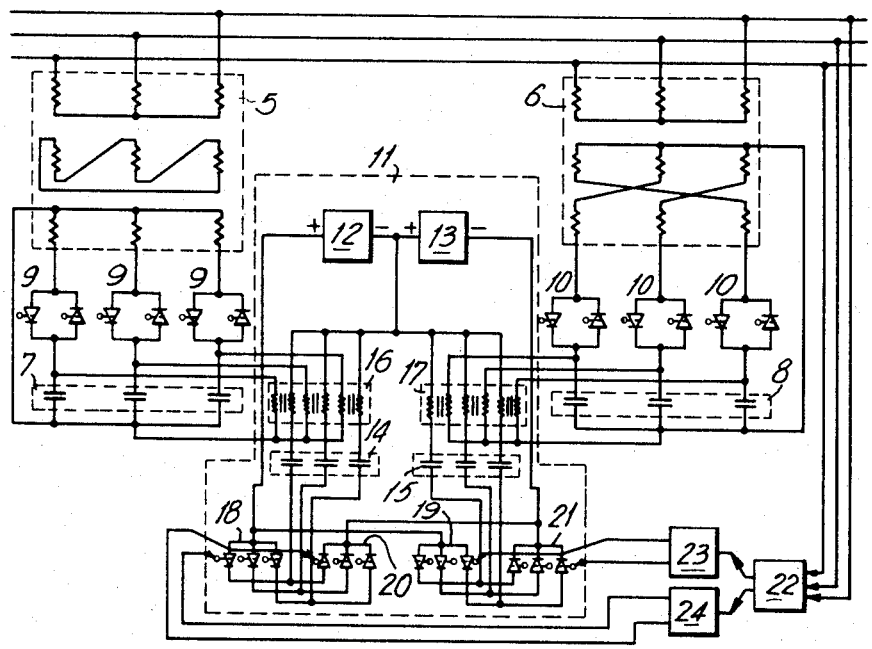
FIG. 3 illustrates the circuit diagram of the three-phase embodiment of the invention.

The circuit diagram of the device embodying the above regulation technique of three-phase reactive power is shown in FIG. 3.

The device comprises two identical balanced three-phase circuits differing only in the winding connections of their power transformers 5, 6. Each circuit includes a static capacitor bank 7 and 8 respectively connected in a three-phase configuration. Each phase of said bank, series-connected with controlled gates 9, 10 placed in parallel opposition is fed by its power transformer 5, 6 respectively. The windings of power transformers 5, 6 are connected in such a manner as to suppress higher current harmonics. The windings of transformer 5 are connected into a star-star-delta configuration, and those of transformer 6 are connected into a star-zigzag configuration.

To vary the conduction time of gates 9, 10, static capacitor banks 7, 8 are charged by control pulse generator 11. Control pulse generator 11 incorporates D.C. voltage sources 12, 13 and two three-phase oscillatory circuits built around capacitors 14, 15, and pulse transformers 16 and 17. One winding of each pulse transformer is connected with the plates of static capacitors 7, 8. The control pulse generator also includes six ancillary anode gates 18, 19 and six ancillary cathode gates 20, 21 which control oscillatory circuit currents.

Ancillary gates 18, 19, 20, 21 are controlled by automatic controlling element 22 and control elements 23, 24 which establish the instant when ancillary gates 18, 19, 20, 21 begin to conduct. Gates 9, 10 are opened by pulses $U_3$ (see FIG. 2), 90 electric degrees long and shifted 90° with respect to the beginning of each half-cycle of supply voltage $U_1$.

FIG. 2 illustrates $U_{3(1)}$ and $U_{3(2)}$ waveforms and their shift relative to supply voltage $U_1$. As can be observed from the diagram, long control pulses open gates 9, 10 when the gate anodes are driven positive with respect to their cathodes.

Each phase of the reactive power regulator operates as described above, in the treatment of the basic features of the invention. The waveform of the reactive current which is the total of the circuit currents is close to a sinusoid. This is achieved by suppressing the higher current harmonics by means of the appropriate connection of the windings of supply transformers 5, 6.

Boost current pulses charging static capacitors 7, 8 are generated by control pulse generator 11 when one of ancillary gates 18, 19, 20, 21 begins to conduct. One of capacitors 14, 15 which is associated with the oscillatory circuit of the respective phase discharges, the conducting gate passes the first half-wave of the discharge current and ceases to conduct. The generated current pulse is transformed and applied to phase capacitors 7, 8. Anode gates 18, 19 and cathode gates 20, 21 are intended for producing pulses of opposite polarity. Control pulses applied to ancillary gates 18, 19, 20, 21 are formed by automatic control element 22. The regulator is capable of equal variation of the reactive power outputs of the three phases and also of separate regulation of each phase. In the latter application, the regulator can be used to balance the network.

What is claimed is:

1. A device for regulating reactive power in electric networks, which comprises at least two three-phase supply transformers connected to suppress higher current harmonics; two balanced three-phase circuits fed by said three-phase transformers, each of said balanced circuits including controlled gates connected in parallel opposition, and static capacitors series-connected with the controlled gates; and a current pulse generator for charging said static capacitors of the balanced circuits.

2. A device as claimed in claim 1, in which the pulse generator comprises two balanced three-phase oscillatory circuits, each including banks of pulse transformers and capacitors, two D.C. voltage sources supplying said oscillatory circuits, and banks of ancillary gates for control of said oscillatory circuit currents.

References Cited

UNITED STATES PATENTS

| | | | |
|---|---|---|---|
| 1,640,539 | 8/1927 | Evans | 323—108 X |
| 1,959,162 | 5/1934 | Guttsmann | 323—120 |
| 2,099,568 | 11/1937 | Metzger | 323—101 |

MILTON O. HIRSHFIELD, *Primary Examiner.*

W. E. RAY, *Assistant Examiner.*